(12) United States Patent
Kasahara et al.

(10) Patent No.: US 6,653,355 B1
(45) Date of Patent: Nov. 25, 2003

(54) TREATING AGENT FOR OIL

(75) Inventors: Tatsuo Kasahara, Koshigaya (JP); Tomohiro Shiiya, Kasukabe (JP); Kunimitsu Tamura, Saitama (JP)

(73) Assignees: Hakugen Co., Ltd., Tokyo (JP); Prest Corporation, Saitama (JP)

( * ) Notice: Subject to any disclaimer, the term of this patent is extended or adjusted under 35 U.S.C. 154(b) by 0 days.

(21) Appl. No.: 09/623,408

(22) PCT Filed: Mar. 3, 1999

(86) PCT No.: PCT/JP99/01015
§ 371 (c)(1),
(2), (4) Date: Sep. 5, 2000

(87) PCT Pub. No.: WO99/45086
PCT Pub. Date: Sep. 10, 1999

(51) Int. Cl.$^7$ .................................................. C09K 3/32
(52) U.S. Cl. .................. 516/21; 516/102; 516/109; 516/27; 252/182.12; 252/182.32; 252/367.1; 44/302; 588/201; 588/252; 588/901
(58) Field of Search .......................... 516/21, 27, 102, 516/109; 588/201, 252, 901, 18; 554/156, 157; 44/301, 302; 252/182.12, 182.32, 367.1

(56) References Cited

U.S. PATENT DOCUMENTS

| | | | | |
|---|---|---|---|---|
| 2,684,949 A | * | 7/1954 | McMillan et al. ............. 516/21 |
| 3,269,946 A | * | 8/1966 | Wiese ......................... 508/287 |
| 3,378,494 A | * | 4/1968 | Berger ......................... 516/27 |
| 3,916,997 A | * | 11/1975 | Douglas et al. ............. 166/275 |
| 4,009,117 A | * | 2/1977 | Newingham et al. ......... 516/24 |
| 4,307,034 A | * | 12/1981 | Nakayama et al. ........... 516/21 |
| 4,839,089 A | * | 6/1989 | Shimizu ................ 252/182.12 |
| 5,000,870 A | * | 3/1991 | Shimizu ................ 252/182.12 |
| 5,380,343 A | * | 1/1995 | Hunter ......................... 44/301 |
| 5,908,377 A | * | 6/1999 | Fukuda ....................... 516/102 |
| 6,066,186 A | * | 5/2000 | Matsumoto ................... 516/21 |

FOREIGN PATENT DOCUMENTS

| | | |
|---|---|---|
| JP | 61-116000 | 6/1986 |
| JP | 5-263100 | 10/1993 |
| JP | 9-13072 | 1/1997 |

* cited by examiner

*Primary Examiner*—Daniel S. Metzmaier
(74) *Attorney, Agent, or Firm*—Armstrong, Westerman & Hattori, LLP.

(57) ABSTRACT

An oil treating agent of W/O emulsion, wherein an aqueous dispersed phase is dispersed in an oily continuous phase, and wherein the dispersed phase is an alkaline mixture solution obtained by mixing water, a solution comprising water and an alcohol, or a water-free alcohol solution with an alkali hydroxide e.g. sodium hydroxide or with a metal alkoxide e.g. sodium alkoxide and the continuous phase comprises a liquid incompatible with the dispersed phase.

4 Claims, 1 Drawing Sheet

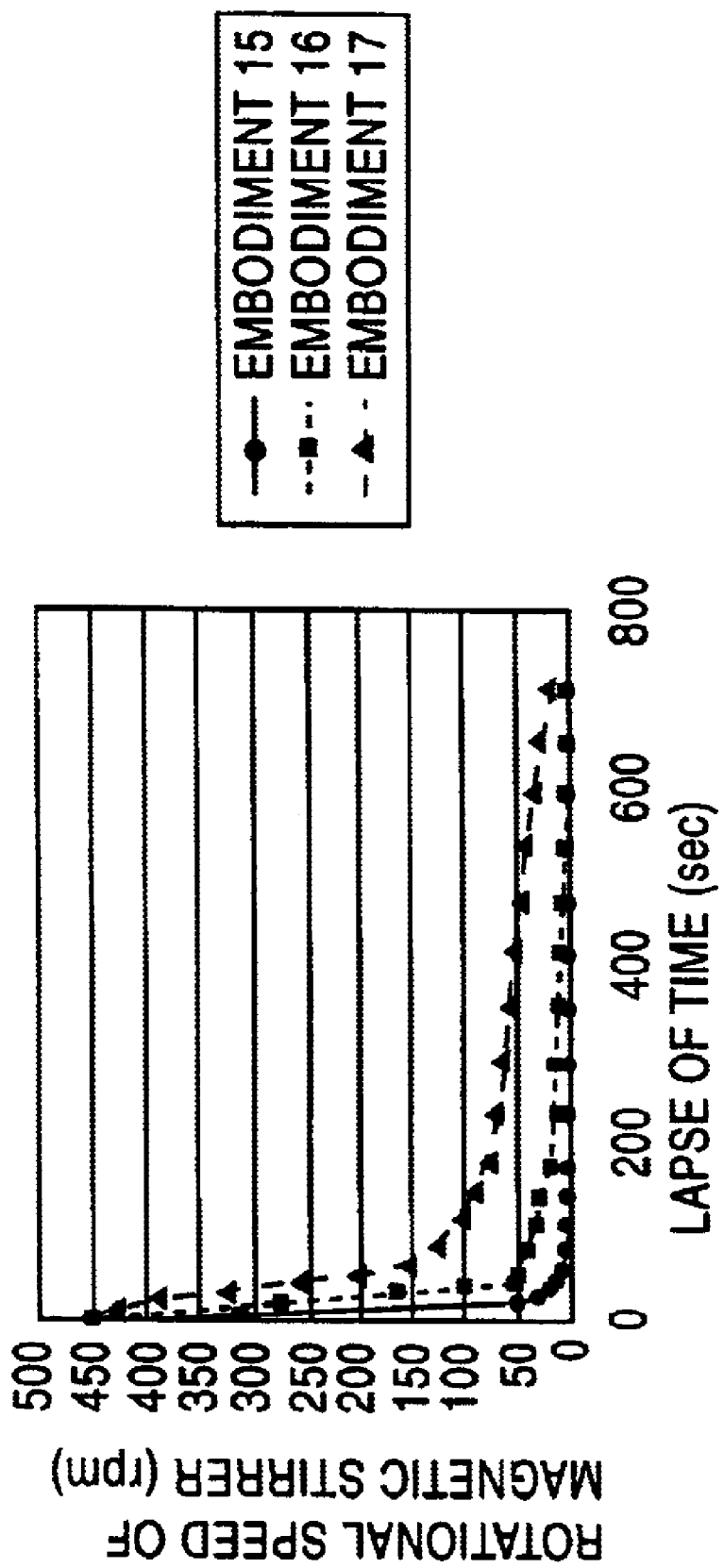

TREATING AGENT FOR OIL

TECHNICAL FIELD

This invention relates to an oil treating agent, in particular, to an oil treating agent directed to solidify e.g. Tempura-oil for domestic use or a waste oil from food oils for business use.

BACKGROUND ART

Conventionally, when treating a Tempura-oil used for deep-fried foods or waste food oil from food business (hereinafter referred to as waste oil), the waste oil is solidified by throwing a low-molecular polyethylene or paraffin thereinto and then is discarded. The invention described in Japanese Patent Application Publication No. Sho 60-054092 presents a solidification treatment of waste food oil comprising: adding a proper amount of 12-hydroxystearic acid to the waste food oil; dissolving it therein by heating in the absence of water; and then cooling the resultant mixture. The invention mentioned in Japanese Patent Application Laid-Open No. Hei 9-013072 provides a method for saponifying a fat and oil liquid at normal temperatures with alkali of e.g. sodium hydroxide or potassium hydroxide, which method comprises saponifying it with $\frac{1}{6}$ to $\frac{1}{3}$ of amount of alkali required for the complete saponification and then using a solvent-based (homogeneous system) saponification accelerator to solidify the fat and oil in about 1 to 3 minutes after the beginning of the saponification.

However, there is a problem that the waste oil never solidifies unless the low-molecular polyethylene or paraffin is added to the waste oil still remaining at high temperatures.

The invention disclosed in Japanese Patent Application Publication No. Sho 60-054092 is accompanied with a problem that the waste oil never gets solid unless the additive is added to the waste oil still staying at high temperatures, and hence the cooled oil must be heated before the solidification treatment. The waste oil never solidifies until it is cooled down to room temperature, and hence it brings about a problem of taking a lot of trouble and time.

According to the invention of Japanese Patent Application Laid-Open No. Hei 9-013072, the waste oil may solidifies between room temperature and about 90° C., however, the contact area between the saponification accelerator and waste oil is still small because the saponification accelerator is a homogeneous solution, and the saponification accelerator hardly mixes with the waste oil because the compatibility therebetween is low, thus taking a lot of trouble with the mixing. Furthermore, because such a saponification accelerator is not so mixable as to hardly accelerate the saponification reaction, the reaction has to need an excess amount of strong alkali. When the strong alkali having a corrosive property is contacted with human body, it may undesirably damage the skin. Also, it is apprehended that the corrosiveness of strong alkali corrodes even metals, and also there is a fear that the corrosiveness may erode cooking utensils e.g. Tempura pans, which is not preferable.

Considering the demerits of the prior arts, the object of the present invention is to provide an oil treating agent capable of solidifying the waste oil, easily mixable with the waste oil, and allowed to reduce the usage of strong alkali.

DISCLOSURE OF THE INVENTION

All references herein to measurement percentages are understood to refer to weight percentages, unless otherwise noted.

A first oil treating agent of the invention, directed to solve the above problems, is a W/O emulsion comprising an oily continuous phase and an aqueous dispersed phase dispersed therein, wherein the dispersed phase is an alkaline mixture solution obtained by mixing water, a solution comprising water and an alcohol, or a water-free alcohol solution with an alkali hydroxide e.g. sodium hydroxide or with a metal alkoxide e.g. sodium alkoxide, and wherein the continuous phase comprises a liquid incompatible with the dispersed phase.

A second oil treating agent of the invention is a W/O emulsion according to the first oil treating agent, wherein a surface-active agent is employed as a dispersant for dispersing the dispersed phase in the continuous phase.

A third oil treating agent of the invention is according to the second treating agent, wherein the size of the particles forming the dispersed phase is no more than 15 $\mu$m.

A fourth oil treating agent of the invention is according to the second treating agent, wherein the surface-active agent includes one or more kinds of surface-active agents selected from the group consisting of polyalkenylsuccinimide or its derivatives, polyalkenylsuccinamide or its derivatives, polyolefinamide-based compound or its derivatives, alkyl/alkenylamine-based compound or its derivatives, polyolefinamidealkene amine-based compound or its derivatives, polyoxyethylene-based compound, polyoxyphenylether-based compound, alkali metal soap-based compound, and alkali earth metal soap-based compound.

A fifth oil treating agent is according to the first oil treating agent, wherein the size of the particles of the dispersed phase no more than 15 $\mu$m.

A sixth oil treating agent is according to the first oil treating agent, wherein the continuous phase is of mineral oil or synthetic oil.

A seventh oil treating agent is according to the sixth oil treating agent, wherein the continuous phase comprises one or more oil components selected from the group consisting of spindle oil, trans oil, neutral oil and bright stock oil (as a lubricant base oil viz. mineral oil); petroleumnaphtha, gasoline, kerosene and light oil (as a fuel oil); process oils.; liquid paraffins; and synthesis-based ether oil, synthesis-based polyalkylene glycol oil, synthesis-based polyalphaolefin, alkylbenzene oil and silicone oil (as a synthetic oil).

An eighth oil treating agent is a W/O emulsion which comprises the dispersed phase of a mixture solution comprising ethanol and a water dissolved with sodium hydroxide and the continuous phase of one or more kinds selected from the group consisting of paraffin hydrocarbon, olefin-based hydrocarbon and aromatic hydrocarbon each having a flash point of no less than 50° C., wherein the dispersed phase in the form of particles with a size of about 10 $\mu$m is dispersed in the continuous phase with the aid of surface-active agent.

A ninth treating agent is according to the first oil treating agent, wherein the dispersed phase comprises 2 to 30% of sodium hydroxide, 1 to 40% of water, and 2 to 80% of ethanol and the continuous phase is of mineral oil.

The oil treating agent of the invention is a W/O emulsion comprising the dispersed phase of an alkali hydroxide or alkaline mixture solution, accordingly, it disperses a small amount of countless alkaline particles in the waste oil to start the saponification reaction when added to the waste oil. In this case, such alkaline particles may be uniformly dispersed in the waste oil; a small amount of alkali provides the sufficient contact area between the alkaline solution and waste liquid because the alkaline particles are of liquid; and hence the waste oil may be quickly treated for solidification.

BRIEF DESCRIPTION OF THE DRAWING

The FIGURE is a view for explaining the solidification states corresponding to the embodiments 15, 16 and 17.

BEST MODE FOR CARRYING OUT THE INVENTION

Hereinafter, the embodiments of the invention are explained. The inventors, as a result of studying hard, paid notice to the following points to find out the solutions of the problems.

Namely, the oil treating agent is made of a W/O emulsion; the dispersed phase in the emulsion is formed of particles each having a size equal to or less than 15 μm and containing an alkaline solution e.g. sodium hydroxide of high concentration therein; but then the continuous phase comprises a solution incompatible with the particles in the emulsion. According to the findings, the alkaline solution of high concentration can be contained in an infinite number of small particles, and hence the contact area between the waste oil and the alkaline solution taking the form of countless particles can be enlarged by mixing the waste oil added with the particles so that the saponification reaction quickly makes progress as a whole and the waste oil is solidified in the shortest time. In this case, the emulsion particles may be stably suspended in the liquid as small particles by forming swelling micells on the interfaces between the particles and continuous phase by adsorption of surface-active agent.

By the way, the background or history of the invention is explained. Food oil or the like is basically known as a fatty acid ester of fatty acid and glycerin in respect of chemical constitution. The reaction between such an oil and alkali e.g. sodium hydroxide produces fatty acid soda viz. a refined and solidified soap. The production of the soap normally needs a caustic alkali enough to completely saponify the ester.

The invention is based on that the waste oil is solidified by utilizing a solidification phenomenon made by adding a caustic alkali to food oil. In such a waste oil treatment, it is not necessary to saponify all the waste oil and the partial saponification is enough. In other wards, it is satisfactory to attain the solidification by the partial saponification. (The object is to be directed to the solidification of the waste oil, not to the complete saponification thereof, which differs from the production of soap.)

On the basis of such recognitions, conventionally, there has been investigated a solution-type viz. homogeneous system solvent-based solidifying agent obtained by dissolving sodium hydroxide in a base material of e.g. water-alcohol. On the other hand, the inventors have recognized that the solvent-based solidifying agent needs an alkaline solution of high concentration in order to solidify the waste oil up to a substantial solidification level by using a certain amount of solidifying agent. Namely, because the reactivity between the waste oil and oil treating agent is reduced, an excess amount of alkaline solution of high concentration is needed. Furthermore, there are the demerits of the solvent-based solidification treating agent using an alkaline solution of high concentration, including a problem of safety raising from the contact between the solidifying agent and the skin involved and a problem of being corrosive to the Tempura pans involved, because the solidifying agent is high in alkali concentration.

At the outcome of investigating the solidifying performance of solvent-based solidification-treating agents low in alkaline concentration, the solidification proved insufficient.

Accordingly, the inventors have hard studied the causes therefor and then reached the following conclusions: when the conventional solvent-based solidification-treating agent is admixed with a food oil in a case e.g. Tempura pan, the resultant mixture cannot be sufficiently mixed by a manual mixing operation by e.g. an operator or housemistress using e.g. cooking chopsticks or spatula because the agent is a liquid which is homogeneous as a whole; and the contact area between alkaline solution and Tempura oil is small so that the rate of saponification reaction is reduced. To solve this, it is conventionally required to add an excess mount of alkali thereto or to raise the concentration of alkali in surplus (e.g. the concentration of up to 20 to 40% based on the whole treating agent). That is, since the conventional solvent-based oil treating agent is originally a nearly homogeneous liquid, the contact between the alkaline solution and waste oil from e.g. food oil is made by only such a mixing after the oil treating agent is added thereto, thus enlarging the size of the particles of alkaline component and reducing the contact area between the waste oil and alkaline solution.

To cope with such problems, in the present invention, by forming an oil treating agent of W/O emulsion and by preparing an alkaline solution in the form of small particles to start dispersing therein, even a little mixing level brings about the enlarged contact area between the waste oil and alkaline solution.

Such an emulsion-type oil treating agent can exert a sufficient solidifying performance in spite of reducing the concentration of alkali in the treating agent, because of confining alkali within liquid particles in W/O emulsion. In other words, when applying the oil treating agent to the waste oil, the small particles of alkaline solution disperse therein to increase the contact area with the waste oil by leaps and bounds in comparison with any conventional oil treating agent and to enlarge the reaction rate of the saponification. Accordingly, the usage of alkali may be decreased, which reduces the possibilities that the user is damaged when contacting with the oil treating agent and that the cooking device containing the waste oil is corroded.

Now, the above oil treating agent is explained more specifically. The gist of the oil treating agent of the invention is to provide a water-in-oil (W/O) emulsion by blending/mixing an alkaline water/alcohol solution with a solution incompatible or little compatible with the water/alcohol solution. Namely, a solution admixed with alkali is employed as the dispersed phase. The continuous phase is needed to be a liquid base material not adapted to mutually dissolve in the components of the dispersed phase (viz. incompatible or little compatible with the components). The continuous phase is made of pref. oil of e.g. mineral oil or synthetic oil in order to set the treating agent more mixable with the waste oil and thereby enhance the rate of solidification.

That is, as a preferable example of the continuous phase, a mineral oil or synthetic oil is preferable, and it is possible to blend one or more kinds of such oils and use a highly refined white oil as a mineral oil. For example, the followings are shown: a lubricant base oil viz. mineral oil, including spindle oil, trans oil, neutral oil and bright stock oil; a fuel oil, including petroleum naphtha, gasoline, kerosene and light oil; process oils; and a synthetic oil, including synthesis-based ester oil, synthesis-based ether oil, synthesis-based polyalkylene glycol oil, synthesis-based polyalphaolefin, alkylbenzene oil and silicone oil.

The ratio of the continuous phase to the whole W/O emulsion is unlimited, however, it is pref. about 40 to 95%.

The proportion of water, water and alcohol, and an alcohol to be admixed with an alkaline component is unlimited, however, the proportion of an alkaline component : water : alcohol is most pref. 3:3:7.

A strong alkali to be used in the dispersed phase is unlimited, however, it is pref. to use e.g. sodium hydroxide, potassium hydroxide, lithium hydroxide or barium hydroxide. Sodium hydroxide is more pref. used.

As the metal alkoxide of the invention, sodium alkoxide is pref. used, and sodium ethoxide, sodium methoxide or the mixture thereof is used.

The alkali concentration of the alkaline solution of the dispersed phase is pref. about 3 to 60%, more pref. nearly 30%. The ratio of water to alcohol is unlimited, however, the ratio of water to alcohol is pref. about (20 to 40) to (60 to 80).

The size of the particles of alkaline mixture solution in the dispersed phase is unlimited, however, it is pref. no more than 15 $\mu$m, more pref. no more than 10 $\mu$m, and most pref. no more than 3 $\mu$m. When the particle size becomes larger, the reactivity is reduced and the stable dispersibility for emulsion is degraded.

It is not refused to use a powder as a component of the oil treating agent for filling the oil treating agent or reducing the alkali concentration, it is allowed to blend calcium hydroxide, calcium sulfate, bentonite, kaolinite, pearlite or carbonaceous particles of e.g. carbon black or activated carbon.

The oil treating agent of the invention may pref. employ a surface-active agent as a dispersant serving to disperse the alkaline mixture solution in the oil component for forming the W/O emulsion. In the case of using no dispersant, it meets the purpose to add the oil treating agent to the waste oil after strongly mixing the treating agent when used (just before adding the oil treating agent of the invention to the waste oil). For example, when using a bottle containing a single usage, if the bottle is shaken in whole, it dispenses with the mixing of the oil treating agent.

The surface-active agent is unlimited as long as it can stably disperse the dispersed phase in the continuous phase, and it is proper to appropriately change the kind and usage of the surface-active agent in consideration of e.g. the property of the oil component in the continuous phase or the concentration of the dispersed phase. For example, there may be used one or more kinds of surface-active agents selected from the group consisting of polyalkenylsuccinimide or its derivatives, polyalkenylsuccinamide or its derivatives, polyolefinamide-based compound or its derivatives, alkyl/alkenylamine-based compound or its derivatives, polyolefinamidealkene amine-based compound or its derivatives, polyoxyethylene-based compound, polyoxyphenylether-based compound, alkali metal soap-based compound, and alkali earth metal soap-based compound.

For instance, a Tempura oil used by households is treated by using the oil treating agent formed above, this waste oil at about room temperature in the pan is added with the oil treating agent and then stirred. In a moment, the waste oil starts to react with the oil treating agent and then solidifies in nearly one minute, and the thus solidified oil is separated from the pan and thrown out.

That is, because the oil treating agent of the invention is set a W/O emulsion comprising the dispersed phase of an alkali hydroxide or mixture solution of alkali, it disperses an infinite number of fine alkaline particles contained therein in the waste oil to begin the saponification reaction after added to the waste oil. In this case, the oil treating agent of the invention can disperse a limitless number of fine alkaline particles in the waste oil and specifically the alkali takes the form of liquid particles, which leads to that even a small amount of alkaline solution can bring about an sufficient contact area between the waste oil and alkaline solution to quickly subject the waste oil to solidification treatment.

Next, embodiments of the oil treating agent of the invention are specifically explained. The invention is never limited to the following embodiments.

Now, in the embodiments, the results of the comparison between the oil treating agent of the invention and those of prior arts are explained by using four evaluation test methods.

Evaluation Test Method 1

Commercially available glass beakers and a magnetic stirrer are used. The magnetic stirrer is equipped with a stirring element whose rotational speed is directly read via LED display (type: Iuchiseieido model No. HS-500, output power 100V, 0.5A). In the magnetic stirrer, the viscosity of the contents of the beaker increases according as the contents begin to solidify, and hence the load on the stirring element increases to thereby reduce the rotational speed. The rate of reduction of the rotational speed is different according to the degree of the solidification, that is, the harder the contents solidify, the smaller the rotational speed becomes. In other words, the degree of the solidification is recognized by observing the reduction of the rotational speed.

In the first step of the test, the waste oil 50 ml from food oil is poured into the beaker with a volume of 100 ml of Pyrex glass. The stirring element coated with Teflon is put into the beaker and the stirring is started. The rotational speed is set 450 rpm±10 rpm before the oil treating agent is added. Next, immediately after the oil treating agent prepared for the test is put into the beaker, the rotational speed of the stirring element is read and subsequently watched in respect of the variation with time.

Depending on the test, in the case of the oil treating agent excellent in solidifying performance, the rotational speed is dropped all of a sudden because the solidification occurs in the shortest time. A standard of judgment for the solidification is set a 20 rpm (20 revolutions per minutes), and an amount of the oil treating agent necessary for the solidification expressed in terms of alkali (sodium hydroxide) and the solidification time are obtained.

Evaluation Test Method 2

The waste oil (room temperature) of 600 ml from Tempura oil is put into a Tempura pan at room temperature. The waste oil is added with 100 ml of oil treating agent, immediately stirred for one minute to the fullest extent by cooking chopsticks and left as it is. During all that time, the time period until the start of the solidification and the time period required for the completion of the solidification are measured. (The size of the pan is about 27 cmØ in diameter and about 5 cm in depth.)

According to the test method, an amount of alkali (sodium hydroxide) required for solidifying a predetermined quantity of Tempura oil is determined and the differences between the oil treating agent of the invention and those of the prior arts are evaluated.

EMBODIMENTS 1 TO 4 AND COMPARATIVE EXAMPLE 1

Next, the embodiments are specifically explained.

Evaluation test method 1 is applied to Embodiments 1 to 4 and comparative example 1 (each composition is shown in Table 1, unit (g)), and an amount of the oil treating agent required for solidifying the waste oil of 50 ml (45 g) from Tempura oil and the net amount of alkali (sodium hydroxide) are determined. The cases in which the rotational speed reaches no more than 20 rpm within 5 minutes are reckoned to be solidified (symbol:○) and listed in Table 2.

TABLE 1

|  | Embodiment 1 | Embodiment 2 | Embodiment 3 | Embodiment 4 | Comparative Embodiment 1 |
|---|---|---|---|---|---|
| Sodium hydroxide | 10 | 8 | 6 | 5 | 17 |
| Water | 10 | 8 | 6 | 5 | 33 |
| Ethanol | 20 | 18 | 13 | 11 | 7 |
| Neutral oil | 60 | 66 | 75 | 79 | — |
| Surface-active agent (polyalkenylbissuccinimide) | 1.5 | 1.5 | 1.5 | 1.5 | 1.5 |
| Diethylene glycol monoisobuthylether | — | — | — | — | 20 |
| Propylene glycol | — | — | — | — | 20 |
| 30% laurylamine oxide water solution | — | — | — | — | 3 |

TABLE 2

|  |  | Embodiment 1 | Embodiment 2 | Embodiment 3 | Embodiment 4 | Comparative Embodiment 1 |
|---|---|---|---|---|---|---|
| Amount of oil treating agent based on 100 g (g) | 8 | ○ | X | X | X | X |
|  | 10 | ○ | ○ | X | X | X |
|  | 15 | ○ | ○ | ○ | X | X |
|  | 20 | ○ | ○ | ○ | ○ | X |
|  | 25 | ○ | ○ | ○ | ○ | X |
|  | 30 | ○ | ○ | ○ | ○ | ○ |
| Minimum required amount of oil treating agent (g.) |  | 8 | 10 | 15 | 20 | 30 |
| Amount of sodium hydroxide required for solidification (g) |  | 0.36 | 0.36 | 0.4 | 0.45 | 2.57 |

As shown in Tables 1 and 2, in the treating agents for oil of Embodiments 1 to 4, the respective amounts of sodium hydroxide required for solidifying the waste oil of 50 ml are in the range of 0.36 to 0.40 g. Such an amount in Comparative Embodiment 1 is no less than 2.5 g. As above, it is confirmed that the usage of sodium hydroxide in the oil treating agent of the invention never exceeds one-to-several (no more than 1/5) of that, of the prior art.

EMBODIMENTS 5 TO 7

An W/O emulsion used for Embodiments 5 to 7 is prepared by dissolving sodium hydroxide in a mixture solution of water and ethanol for obtaining a solution used for the dispersed phase, by adding it to the continuous phase, and by forcefully mixing it just before putting it into the waste oil.

EMBODIMENTS 8 to 13

An oil treating agent of W/O emulsion is prepared by dissolving sodium hydroxide in a mixture solution of water and ethanol for obtaining a solution used for the dispersed phase and by dispersing it in the continuous phase with the use of surface-active agent.

Evaluation test method 2 is applied to Embodiments 5 to 13 (the compositions are shown in Table 3, unit (g).) and Comparative Embodiments 2 to 6 described later (the compositions are shown in Table 4, unit (g).) and the solidifying performance on the waste oil, which is an advantage of the invention, is observed from the view points of the easiness of the mixing, the solidification state and the speed of solidification. The differences between the invention and the prior arts are made clear by using the following standards of evaluation. The evaluations of Embodiments 5 to 13 and Comparative Embodiments 2 to 6 are summarized in Table 5.

Easiness of Mixing with Waste Oil

◎; notably easy in mixing,
○; easy in mixing,
Δ; a little difficult in mixing,
×; difficult in mixing.

Solidification State

◎; wholly uniformly solidified,
○; nearly wholly solidified and partly soft,
Δ; partly solidified and partly remaining in the form of waste oil,
×; not yet solidified.

Rate of Solidification

◎; solidified at an appropriate rate,
○; solidified slowly,
Δ; the rate of solidification is too high and partly solidified,
×; not yet solidified.

By the way, "the rate of solidification is too high" means as follows: the waste oil begins to partly solidify before the oil treating agent is entirely dispersed; there finally coexist the solidified sections and non-solidified sections; and hence the entire waste oil cannot be treated.

TABLE 3

|  | Dispersed phase | | | Continuous phase Kind | Dispersant Kind |
|---|---|---|---|---|---|
|  | Sodium hydroxide | Water | Ethanol | | |
| Embodiment 5 | 8 | 8 | 20 | Trans oil 64 | — |
| Embodiment 6 | 8 | 8 | 20 | Neutral oil (low viscosity) 64 | — |
| Embodiment 7 | 8 | 8 | 20 | Neutral oil (high viscosity) 64 | — |
| Embodiment 8 | 8 | 8 | 20 | Trans oil 63 | polyalkenylbissuccinimide (low molecular type) 1 |
| Embodiment 9 | 8 | 8 | 20 | Neutral oil (low viscosity) 63 | polyalkenylbissuccinimide (low molecular type) 1 |
| Embodiment | 8 | 8 | 20 | Neutral oil | polyalkenylbis- TABLE 3-continued

| | Dispersed phase | | | Continuous phase Kind | Dispersant Kind |
|---|---|---|---|---|---|
| | Sodium hydroxide | Water | Ethanol | | |
| ment 10 | | | | (high viscosity) 63 | succinimide (low molecular type) 1 |
| Embodiment 11 | 8 | 8 | 20 | Trans oil 63 | polyalkenylbis-succinimide (high molecular type) 1 |
| Embodiment 12 | 8 | 8 | 20 | Neutral oil (low viscosity) 63 | polyalkenylbis-succinimide (high molecular type) 1 |
| Embodiment 13 | 8 | 8 | 20 | Neutral oil (high viscosity) 63 | polyalkenylbis-succinimide (high molecular type) 1 |

The treating agents for oil of the prior arts are examined as below for comparison with those in Embodiments 5 to 13.

COMPARATIVE EMBODIMENTS 2 to 3

There is added a mixture solution comprising propylene glycol, ethanol, diethylene glycol monoisobutylether and a laurylamine oxide water solution to a water dissolved with sodium hydroxide, thus obtaining a uniform and liquid oil treating agent.

The weight compositions (in grams (g)) of Comparative Embodiments 2 and 3 are shown as Table 4.

COMPARATIVE EMBODIMENTS 4 to 5

There is added a mixture solution comprising 2-phenoxyethanol, polypropylene glycol, isopropylalcohol and a laurylamine oxide water solution to a water dissolved with sodium hydroxide, thus obtaining a uniform and liquid oil treating agent.

The weight compositions (in grams (g)) of Comparative Embodiments 4 and 5 are shown as Table 4.

COMPARATIVE EMBODIMENTS 6

As set forth in table 4, there is employed 15 g of 12-hydroxystearic acid as an oil treating agent for Comparative Embodiment 6. The aspect of 12-hydroxystearic acid is powder.

TABLE 4

| | Comparative Embodiment 2 | Comparative Embodiment 3 | Comparative Embodiment 4 | Comparative Embodiment 5 | Comparative Embodiment 6 |
|---|---|---|---|---|---|
| Sodium hydroxide | 8.0 | 16.7 | 8.0 | 18.4 | — |
| Water | 16.0 | 33.3 | 16.0 | 36.8 | — |
| Ethanol | 3.2 | 6.7 | — | — | — |
| 2-phenoxyethanol | — | — | 10.0 | 24.0 | — |
| Isopropylalcohol | — | — | 2.7 | 6.1 | — |
| Propylene glycol | 9.6 | 20.0 | — | — | — |

TABLE 4-continued

| | Comparative Embodiment 2 | Comparative Embodiment 3 | Comparative Embodiment 4 | Comparative Embodiment 5 | Comparative Embodiment 6 |
|---|---|---|---|---|---|
| Polypropylene glycol | — | — | 5.2 | 12.3 | — |
| Diethylene glycol monoisobutyl-ether | 9.6 | 20.0 | — | — | — |
| 30% laurylamine oxide water solution | 3.3 | 3.3 | 3.3 | 3.3 | — |
| 12-hydroxy-stearic acid | — | — | — | — | 15.0 |

TABLE 5

| | Easiness in mixing | Solidification state | Solidification rate |
|---|---|---|---|
| Embodiment 5 | ⊚ | ⊚ | ⊚ |
| Embodiment 6 | ⊚ | ⊚ | ⊚ |
| Embodiment 7 | ○ | ○ | ○ |
| Embodiment 8 | ⊚ | ⊚ | ⊚ |
| Embodiment 9 | ⊚ | ⊚ | ⊚ |
| Embodiment 10 | ○ | ⊚ | ○ |
| Embodiment 11 | ⊚ | ⊚ | ⊚ |
| Embodiment 12 | ⊚ | ⊚ | ⊚ |
| Embodiment 13 | ○ | ⊚ | ○ |
| Comparative Embodiment 2 | Δ | X | X |
| Comparative Embodiment 3 | Δ | X | X |
| Comparative Embodiment 4 | X | X | X |
| Comparative Embodiment 5 | X | Δ | Δ |
| Comparative Embodiment 6 | X | X | X |

As above, the treating agents for oil of Embodiments 5 to 13 are each easily mixable, provided with a proper rate of solidification and capable of uniformly solidifying the entire waste oil in comparison with those of Comparative Embodiments 2 to 6.

EMBODIMENT 14 AND COMPARATIVE EMBODIMENT 7

Evaluation Test Method 3

As a standard of judgment for the solidification level of a solidified waste oil, there is employed a sedimentation distance measured by gently laying a glass ball with a diameter of 2 cm and weight of 6 g on the solidified waste oil and leaving it to fall down for 10 minutes. The differences from the prior arts are manifested by conducting an eye observation and checking how to discard the solidified waste oil.

Evaluation test method 3 is applied to Embodiment 14 and Comparative Embodiment 7 (the compositions are listed as Table 6, unit (g).), and the solidification levels of the waste oils solidified are observed. The evaluations on Embodiment 14 and Comparative Embodiment 7 are summarized in Table 7.

TABLE 6

|  | Embodiment 14 | Comparative Embodiment 7 |
| --- | --- | --- |
| Sodium hydroxide | 10 | 17 |
| Water | 10 | 33 |
| Ethanol | 20 | 7 |
| Neutral oil | 60 | — |
| Surface-active agent (polyalkenylsuccinimide) | 1.5 | — |
| Diethyleneglycol monoisobutylether | — | 20 |
| Propylene glycol | — | 20 |
| 30% laurylamine oxide water solution | — | 3 |

TABLE 7

|  | Sedimentation distance of glass ball | Eye observation | How to discard |
| --- | --- | --- | --- |
| Embodiment 14 | 2 mm sedimented | solidified in whole | to discard the solid as it is. |
| Comparative Embodiment 7 | 20 mm sedimented | coexistence of solidified sections and oily sections | to treat the oily sections left after discarding the solidified sections |

As shown above, it is confirmed that the oil treating agent of Embodiment 14 is capable of wholly solidifying the waste oil and of easily discarding the treated oil because of leaving no oily sections.

EMBODIMENTS 15 to 17

Evaluation Test Method 4

An oil treating agent is made up by first preparing a mixture solution of sodium hydroxide, water and alcohol as a dispersed phase and by dripping the solution into a continuous phase of mineral oil already admixed with a surface-active agent while stirring it for 20 minutes. The size of particles is stepwise varied through three stages by adjusting a rotational speed of the stirrer in the stirring operation. The particle size is confirmed by measuring an average particle size thereof by using a microscope observation and its photomicrograph. The relation between the particle size and solidification rate is checked by the above evaluation method.

The compositions, rotational speeds ans particle-sizes are shown in Table 8 in respect of Embodiments 15 to 17. The results of tests conducted by Evaluation test method 4 are set forth in Table 9. Furthermore, the solidification state is explained on the basis of Table 9 by using the graph in the Figure.

TABLE 8

|  |  | Embodiment 15 | Embodiment 16 | Embodiment 17 |
| --- | --- | --- | --- | --- |
| Dispersed phase | Sodium hydroxide | 8.0 g | ← | ← |
|  | Water | 8.0 g | ← | ← |
|  | Ethanol | 18.7 g | ← | ← |
| Continuous phase | Neutral oil | 63.3 g | ← | ← |
| Dispersant | polyalkenylbis-succinimide | 1.5 g | ← | ← |
| Rotational speed of stirrer (rpm) |  | 1500 | 600 | 200 |
| Average particle size of liquid particles in dispersed phase (μm) |  | no more than 3 μm | 5 to 15 μm | no less than 15 μm |

TABLE 9

| Stirring time (sec.) | Embodiment 15 | Embodiment 16 | Embodiment 17 |
| --- | --- | --- | --- |
| 0 | 450 | 450 | 450 |
| 10 | 310 | 415 | 430 |
| 20 | 48 | 275 | 385 |
| 30 | 25 | 162 | 324 |
| 40 | 20 | 97 | 258 |
| 50 | 15 | 51 | 202 |
| 60 | 4 | 19 | 150 |
| 90 | 3 | 39 | 124 |
| 120 | 0 | 28 | 101 |
| 150 | 0 | 25 | 87 |
| 180 | 0 | 17 | 74 |
| 240 | 0 | 18 | 70 |
| 300 | 0 | 15 | 64 |
| 360 | 0 | 13 | 58 |
| 420 | 0 | 11 | 50 |
| 480 | 0 | 8 | 44 |
| 540 | 0 | 6 | 38 |
| 600 | 0 | 4 | 33 |
| 660 | 0 | 2 | 26 |
| 720 | 0 | 2 | 20 |

(unit: rpm)

According to Table 8, Table 9 and the Figure, it is supported that the smaller the particle size becomes the higher the solidification rate gets. In other words, it is verified that the particle size enables the solidification rate to be controlled.

INDUSTRIAL APPLICABILITY

As described above in detail, the oil treating agent of the invention has a variety of advantages of being able to solidify waste oil at room temperature, easily mixing with the waste oil, reducing the usage of strong alkali and the like.

What is claimed is:

1. An oil treating agent of W/O emulsion for solidifying a fats and fatty oils or a fatty acid ester, wherein a dispersed phase is dispersed in a continuous phase consisting of one or more kinds of hydrocarbon oils having a flash point of no less than 50° C. selected from the group consisting of
neutral oil, transformer oil, spindle oil, and bright stock oil, as included in a lubricant base oil;
liquid paraffin, as included in a fuel oil; and
synthesis-based polyalphaolefin and alkylbenzene oil, as included in a synthetic oil;
said dispersed phase having sodium hydroxide or sodium ethoxide mixed in a solution comprising water and ethanol, and dispersed using one or more kinds of surface-active agents selected from the group consisting of polyalkenylsuccinimide, polyalkenylsuccinamide, and polyolefinamide-based compound compatible with said continuous phase such that the size of the particles therein is no more than 15 μm.

2. An oil treating agent according to claim 1, wherein it comprises 20–40% by weight of dispersed phase and 60–80% by weight of continuous phase, said dispersed phase comprising 15–40% by weight of water; 37–80% by weight of ethanol, and 15–30% by weight of sodium hydroxide or sodium ethoxide.

3. A mixture, comprising:

an oil treating agent of W/O emulsion, wherein a dispersed phase is dispersed in a continuous phase consisting of one or more kinds of hydrocarbon oils having a flash point of no less than 50° C. selected from the group consisting of neutral oil, transformer oil, spindle oil, bright stock oil, liquid paraffin, synthesis-based polyalphaolefin and alkylbenzene oil; said dispersed phase having sodium hydroxide or sodium ethoxide mixed in a solution comprising water and ethanol and dispersed using one or more kinds of surface-active agents selected from the group consisting of polyalkenylsuccinimide, polyalkenylsuccinamide, and polyolefinamide-based compound compatible with said continuous phase such that the size of the particles therein is no more than 15 μm; and a fats and fatty oils or a fatty acid esters.

4. A mixture, comprising:

an oil treating agent of W/O emulsion, wherein a dispersed phase is dispersed in a continuous phase consisting of one or more kinds of hydrocarbon oils having a flash point of no less than 50° C. selected from the group consisting of neutral oil, transformer oil, spindle oil, bright stock-oil, liquid paraffin, synthesis-based polyalphaolefin and alkylbenzene oil; said dispersed phase having sodium hydroxide or sodium ethoxide mixed in a solution comprising water and ethanol and dispersed using one or more kinds of surface-active agents selected from the group consisting of polyalkenylsuccinimide, polyalkenylsuccinamide, and polyolefinamide-based compound compatible with said continuous phase such that the size of the particles therein is no more than 15 μm; and a fats and fatty oils or a fatty acid esters;

wherein said mixture comprises 20–40% by weight of dispersed phase and 60–80% by weight of continuous phase, said dispersed phase comprising 15–40% by weight of water; 37–80% by weight of ethanol, and 15–30% by weight of sodium hydroxide or sodium ethoxide.

* * * * *